United States Patent
Spiegel et al.

(10) Patent No.: US 6,378,486 B1
(45) Date of Patent: Apr. 30, 2002

(54) FOUR-STROKE INTERNAL COMBUSTION ENGINE WITH DIRECT INJECTION

(75) Inventors: Leo Spiegel, Wolfsburg; Oliver Fladung; Michael Lindlau, both of Braunschweig; Eduard Lippert, Calberlah; Bernd Stiebels, Isenbüttel; Jörg Theobald, Lehre, all of (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 09/762,123

(22) PCT Filed: May 14, 1999

(86) PCT No.: PCT/EP99/03323

§ 371 Date: Mar. 1, 2001

§ 102(e) Date: Mar. 1, 2001

(87) PCT Pub. No.: WO00/08318

PCT Pub. Date: Feb. 17, 2000

(30) Foreign Application Priority Data

Aug. 6, 1998 (DE) ............................ 198 35 563

(51) Int. Cl.⁷ .............................................. F02B 3/00
(52) U.S. Cl. ...................................... 123/298; 123/305
(58) Field of Search .................... 123/298, 305, 123/661

(56) References Cited

U.S. PATENT DOCUMENTS

| | | | | |
|---|---|---|---|---|
| 5,373,820 A | * | 12/1994 | Sakamoto et al. | 123/298 |
| 6,095,114 A | * | 8/2000 | Horie et al. | 123/298 |
| 6,125,817 A | * | 10/2000 | Piock et al. | 123/305 |
| 6,152,103 A | * | 11/2000 | Kudo et al. | 123/298 |
| 6,257,199 B1 | * | 7/2001 | Kanda et al. | 123/305 |

FOREIGN PATENT DOCUMENTS

| DE | 197 30 842 | 1/1999 |
|---|---|---|
| EP | 778 402 | 6/1997 |
| JP | 071 09 925 | 4/1995 |
| JP | 082 46 878 | 9/1996 |
| JP | 082 96 446 | 11/1996 |
| JP | 091 44 543 | 6/1997 |
| JP | 100 08 970 | 1/1998 |

* cited by examiner

Primary Examiner—Erick Solis
(74) Attorney, Agent, or Firm—Cohen, Pontani, Lieberman & Pavane

(57) ABSTRACT

The invention relates to a four stroke internal combustion engine with applied ignition, wherein fuel is directly injected into a combustion chamber by means of an injector. Said engine comprises at least one admission channel with an admission valve and at least one exhaust channel with an exhaust valve, the admission valve and the exhaust valve being placed on opposite sides of the combustion chamber and the injector being placed on the admission valve side. Said engine also comprises a cavity formed in a piston top. A piston exhibits a central longitudinal axis extending in the direction of displacement of said piston. The cavity is placed on the admission valve side and exhibits, relatively to said admission valve and the injector, a marginal area forming the highest point of the piston top so that an airflow originating in the appropriately designed admission channel and penetrating into the combustion chamber through the admission valve and an injection jet originating in the injector and penetrating into the combustion chamber enter the cavity at opposite points.

14 Claims, 6 Drawing Sheets

FOUR-STROKE INTERNAL COMBUSTION ENGINE WITH DIRECT INJECTION

BACKGROUND OF THE INVENTION

1. Field of the Invention

The invention relates to a four-stroke internal combustion engine with spark ignition, with direct injection of a fuel into a combustion space by means of an injection nozzle, with at least one inlet duct having an inlet valve and with at least one outlet duct having an outlet valve. The inlet valve and outlet valve are arranged on opposite sides of the combustion space, and the injection nozzle is arranged on the inlet-valve side. At least one recess is formed in a piston head on the inlet-valve side. A piston having a longitudinal center axis extending in the direction of movement of the piston is also provided. A recess is arranged on the inlet-valve side and designed, with respect to the inlet valve and injection nozzle, with at least one edge portion of the circumferential contour forming the highest point of the piston head, in such a way that an airflow entering the combustion space from the correspondingly designed inlet duct via the inlet valve and an injection jet entering the combustion space from the injection nozzle enter the recess on opposite sides. Furthermore, an elevation dividing the recess into a fuel recess and an air recess transversely to the injection direction is formed on the piston head, in such a way that the injection jet enters the fuel recess on a side located opposite the elevation and the airflow enters the air recess, in the opposite direction to the injection jet, on a side located opposite the elevation.

2. Discussion of the Prior Art

In order to generate a suitable mixture of air and fuel in a combustion space of a four-stroke internal combustion engine with direct injection, it is known to provide special inlet ducts generating tumble or swirl flows and to design piston heads with corresponding recesses and guide ribs. In a swirl flow, a cylinder charge rotates about the cylinder axis, for example by virtue of the shape of the inlet duct, while, in a tumble flow, rotation about an axis parallel to a crankshaft axis can be observed.

Thus, DE 197 13 030 A1, DE 197 13 029 A1 and DE 197 13 028 A1 each describe a four-stroke internal combustion engine with spark ignition and direct injection, a piston surface of each piston of a cylinder in each case having an H-shaped, T-shaped or U-shaped guide-rib arrangement.

EP 0 639 703 A1 and EP 0 694 682 A1 disclose in each case a further embodiment of an internal combustion engine with direct injection, in which a swirl flow is generated in the cylinder space due to the shaping of the inlet ducts. Here, the piston surface has a pronounced recess with a surrounding squeeze or squish area, the recess being arranged eccentrically in such a way that the spark plug located centrally in the combustion space and the radially arranged injection valve are in each case located at the recess edge. The fuel is sprayed directionally against the recess edge which is shaped for this purpose. The piston surface therefore has the task, here, of primarily atomizing the fuel jet. The swirl flow assumes the task of transporting to the spark plug the fuel which rebounds in atomized form from the recess.

EP 0 558 072 A1 discloses a further embodiment of an engine, in which a reversed tumbling movement of the combustion-space flow is generated as a result of the shape and arrangement of the inlet ducts and is reinforced by the piston surface being shaped in the manner of a ski jump. This piston surface serves at the same time for deflecting the injection jet to the spark plug which is arranged in the center of the cylinder. The injection jet and combustion-space flow thus sweep over the piston surface in the same direction. However, after impinging onto the cylinder head wall near the spark plug, the injection jet or the mixture cloud originating from it after deflection at the piston may spread out, virtually unimpeded, in all directions. An attempt at as high a concentration as possible of the mixture cloud after deflection at the piston therefore cannot be detected. Moreover, the ski jump formed on the piston surface generates a squish area below the outlet valve. This, admittedly, generates a desired additional flow movement shortly before top dead center during the compression of the engine. However, after the dead center has been passed, this flow movement is reversed, thus causing the mixture concentration built up during compression to be broken up.

Moreover, all these arrangements have the disadvantage that optimum mixture formation does not take place over an entire characteristic map range of a four-stroke internal combustion engine.

SUMMARY OF THE INVENTION

The object on which the present invention is based is to provide an internal combustion engine of the above-mentioned type with an improved piston, the above-mentioned disadvantages being overcome.

This object is achieved, according to the invention, by means of a four-stroke internal combustion engine of the above-mentioned type having a piston with a novel configuration.

For this purpose, there is provision, according to the invention, for, in the sectional plane, the fuel recess to have a depth $t_{Ka}$ between the elevation and a lower fuel-recess edge of 4 mm to 12 mm. In the sectional plane, the air recess has a depth $t_L$ with respect to an air-recess edge located opposite the elevation of 2 mm to 10 mm. In the sectional plane, a tangent of a fuel-recess wall at a fuel-recess edge located opposite the elevation forms with the longitudinal center axis an angle $\gamma_{K1}$ of 40 degrees to 62 degrees. In the sectional plane, a tangent of an air-recess wall at a fuel-recess edge located opposite the elevation forms with the longitudinal center axis an angle $\gamma_{L1}$ of 30 degrees to 62 degrees.

The combination of these special geometric features results surprisingly in an optimum control of the stratified profile by means of an accurate coordination of the spatial arrangement of the injector or injection nozzle and the ignition point or spark plug within wide characteristic map ranges. The sensitivity of the mixture formation as regards production variations and use-related changes in the injector is reduced. The combustion profile exhibits continuous energy conversion, at the same time taking into account all the requirements of outstanding full-load potential. Furthermore, the invention can be integrated in a simple way into already existing multi-valve cylinder-head concepts.

In respective of preferred embodiments, the elevation projects above the piston head, the depth $t_{Ka}$ is 11.1 mm, 11.41 mm, 11.47 mm or 4.6 mm, the depth $t_L$ is 8 mm, 3.07 mm, 2.5 mm or 8.5 mm, the angle $\gamma_{L1}$ is 50.6 degrees, 54.2 degrees, 60.4 degrees or 34.8 degrees, the angle $\gamma_{K1}$ is 56.4 degrees, 48.9 degrees, 49.8 degrees or 60.4 degrees. In still further embodiments, in a sectional plane, the air-recess edge located opposite the elevation is at a perpendicular distance $x_L$ from the longitudinal center axis of 33 mm to 36 mm, in particular 35.76 mm, 34.6 mm, 35.75 mm or 33.27 mm, in the sectional plane, the elevation is at a perpendicular distance $x_E$ from the longitudinal center axis of 0 mm to 7 mm, in particular 0.5 mm, 6.85 mm, 2 mm, 4.14 mm or 2 mm, in the sectional plane, a tangent of a fuel-recess wall at the elevation forms with the longitudinal center axis an angle $\gamma_{K2}$ of 10 degrees to 50 degrees, in particular 20.9 degrees, 12.5 degrees, 18.7 degrees or 46.5 degrees, and/or, in the sectional plane, a tangent of an air-recess wall at the elevation forms with the longitudinal center axis an angle $\gamma_{L2}$ of 0 degrees to 80 degrees, in particular 23.2 degrees, 64.6 degrees, 77.3 degrees or 47.7 degrees.

Further features, advantages and advantageous refinements of the invention may be gathered from the dependent claims and from the following description of the invention with reference to the accompanying drawings.

DETAILED DESCRIPTION OF THE PREFERRED EMBODIMENTS

Figure 1:
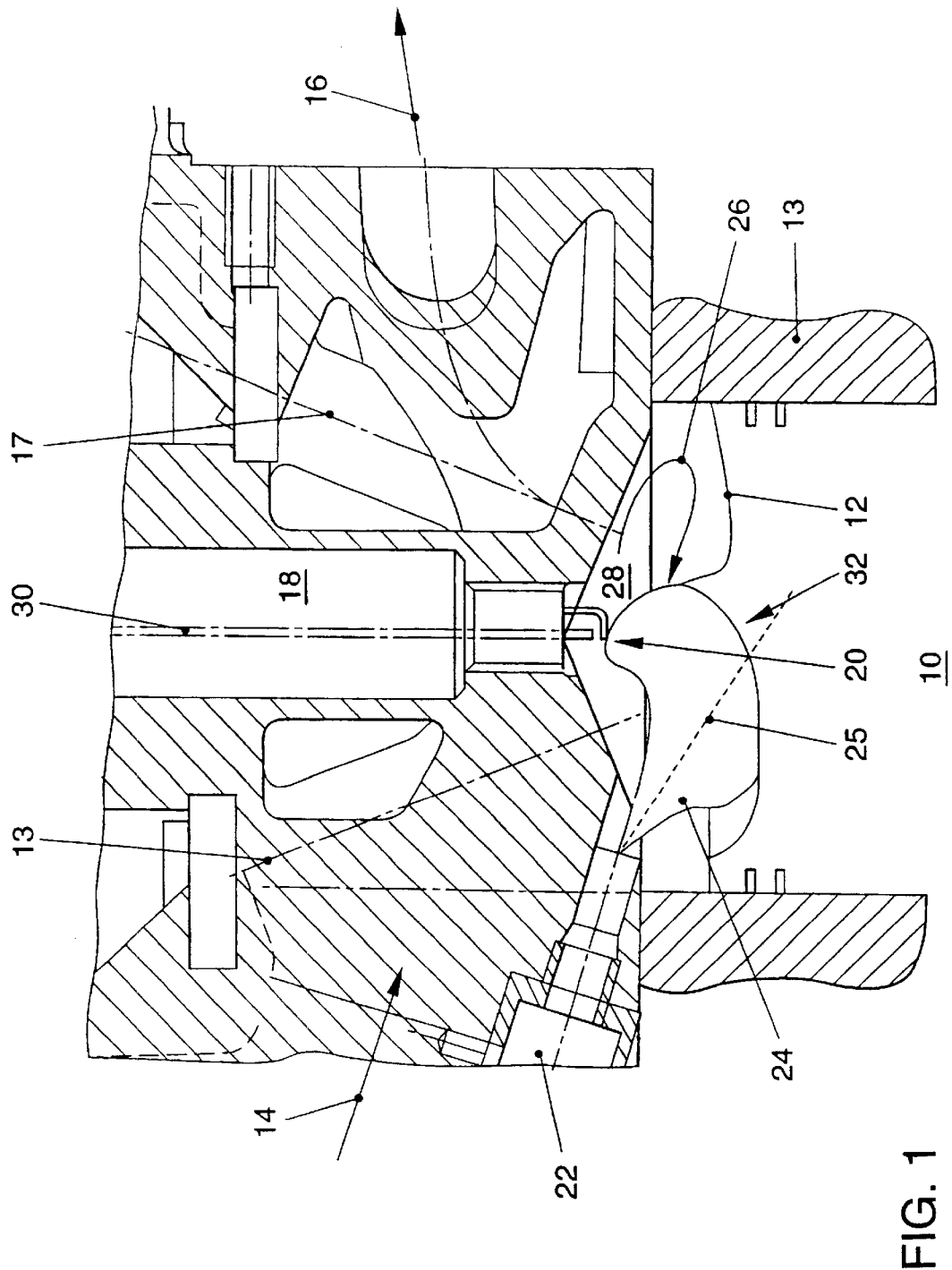
FIG. 1 shows a preferred embodiment of a four-stroke internal combustion engine according to the invention.

The preferred embodiment, illustrated in FIG. 1, of a four-stroke internal combustion engine according to the invention comprises a piston 10 with a piston head 12, which is capable of being moved up and down in a cylinder 13, an inlet duct 14 having an inlet-valve axis 15, an outlet duct 16 having an outlet-valve axis 17 and a spark plug 18 having an ignition point 20. Fuel is capable of being injected in an injection jet 24 in the direction of an injection axis 25 by means of an injection nozzle 22. Fresh air flows in a tumble flow 26 through the inlet duct 14 into a combustion space 28.

The piston defines a longitudinal center axis 30 which is in line with or is near to a longitudinal axis of the spark plug 18, the ignition point 20 being located on or in the immediate vicinity of the longitudinal center axis 30. The piston head 12 has a recess 32, into which the injection jet 24 is directed. As may be gathered directly from FIG. 1, the injection nozzle 22 is arranged on the inlet-duct side and below the inlet duct 14. Two or more inlet and outlet ducts 14, 16 may also be provided in this case. These are then designed, for example, with separate inlet-duct cutoffs. The recess 32 and the arrangement of the inlet and outlet ducts 14, 16 and of the injection nozzle 22 are at the same time selected, according to the invention, such that either a tumble flow alone or a tumble flow combined with a swirl flow is obtained. The arrangement in the case of a plurality of outlet ducts 16 is preferably siamese.

Figure 2:
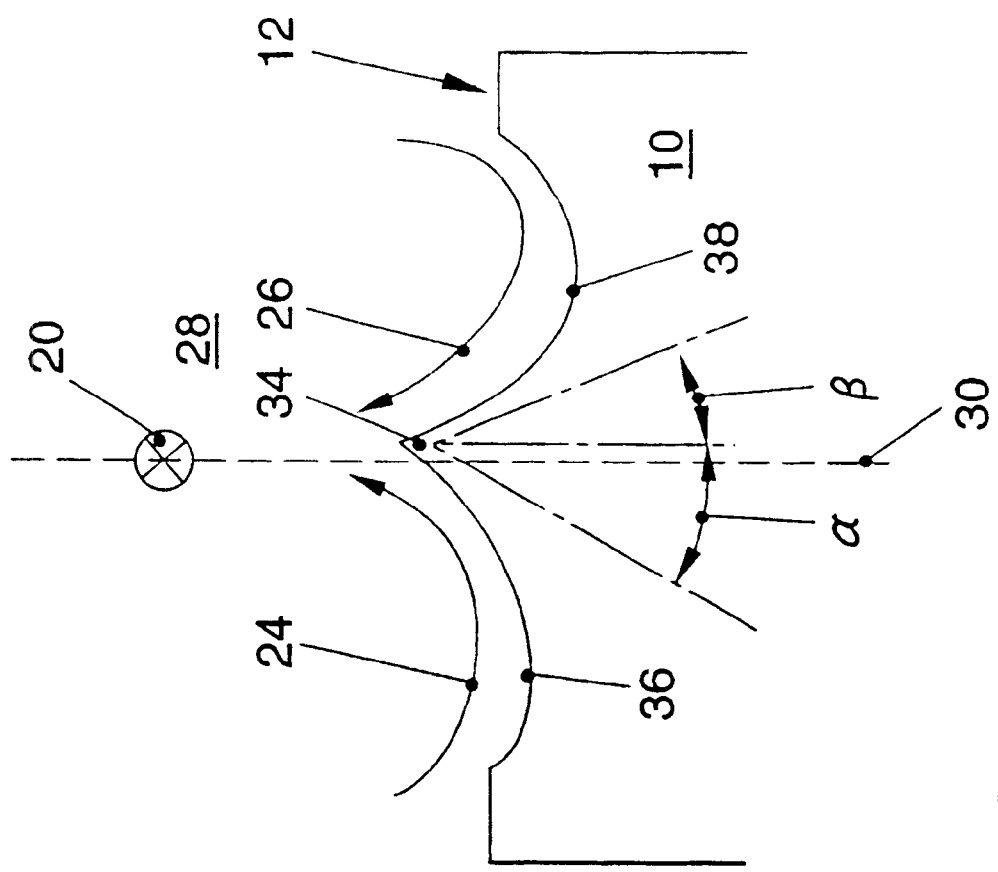
FIG. 2 shows a second preferred embodiment of piston geometry in a basic illustration.
Figure 3A:
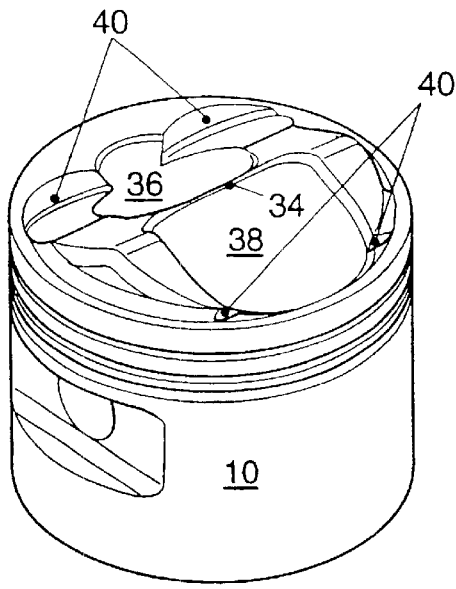
FIGS. 3 to 6 show special exemplary embodiments of piston geometry according to FIG. 2, in each case in a perspective view, in a top view and in corresponding sectional views along the lines in the respective top views.
Figure 3D:
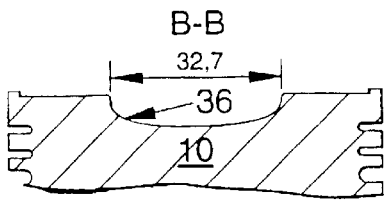
Figure 3E:
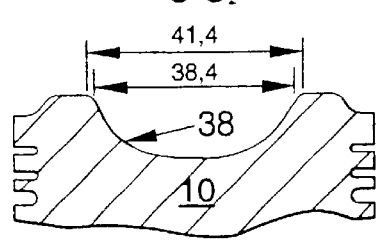
Figure 3F:
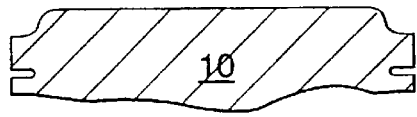
Figure 3C:
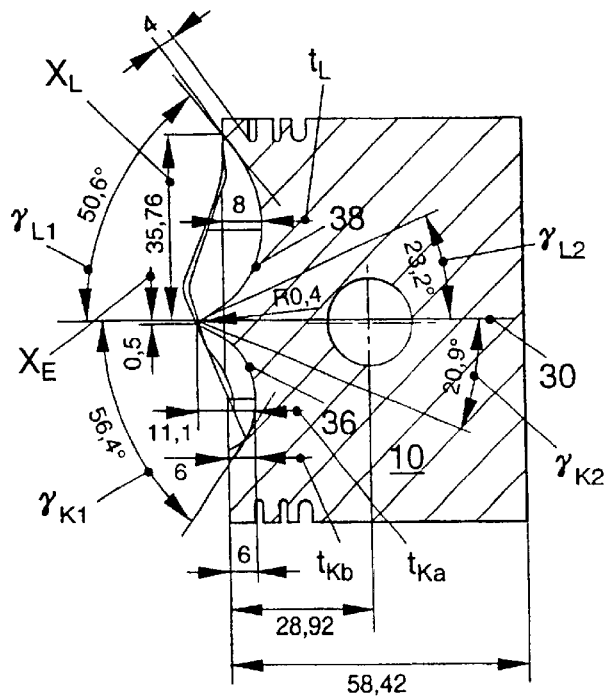
Figure 3B:
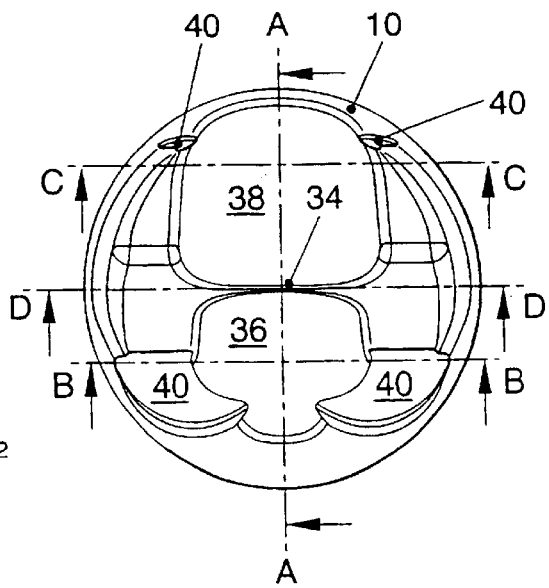
Figure 4A:
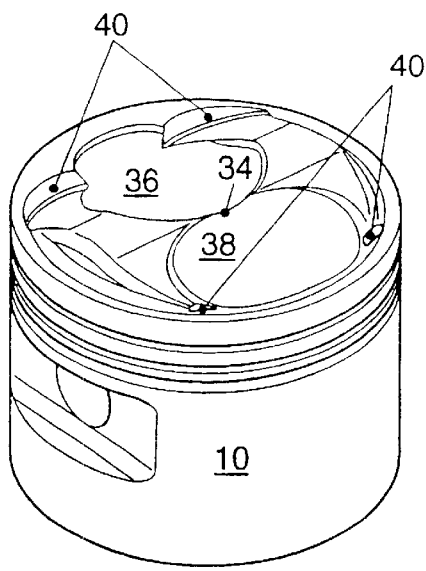
Figure 4D:
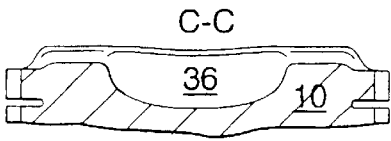
Figure 4E:
Figure 4F:
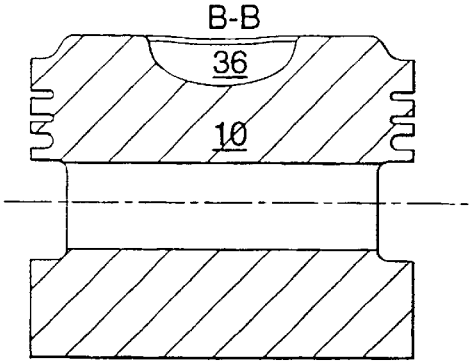
Figure 4C:
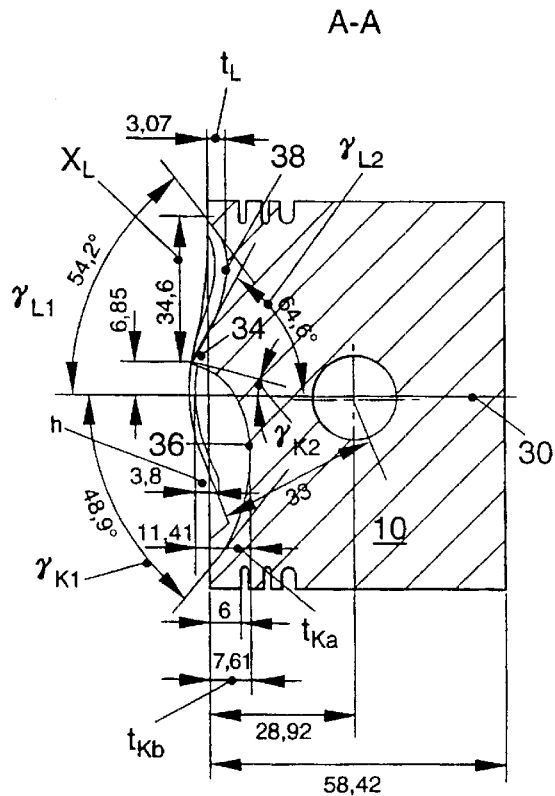
Figure 4B:
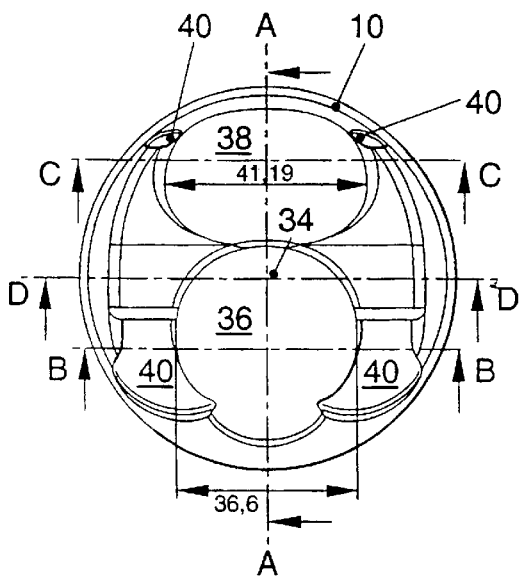
Figure 5A:
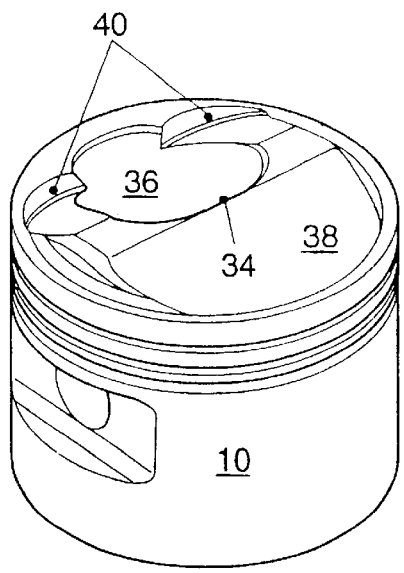
Figure 5D:
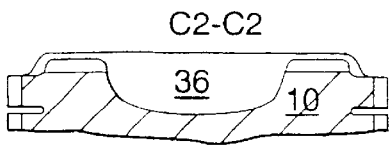
Figure 5E:
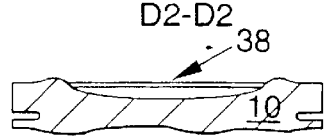
Figure 5F:
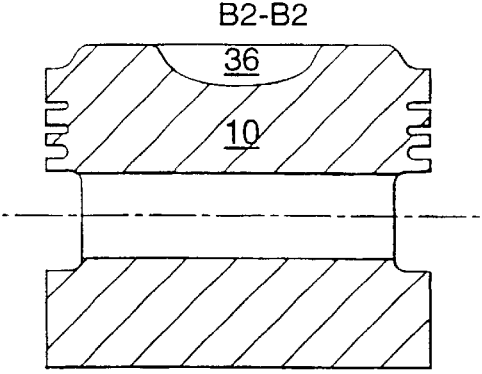
Figure 5C:
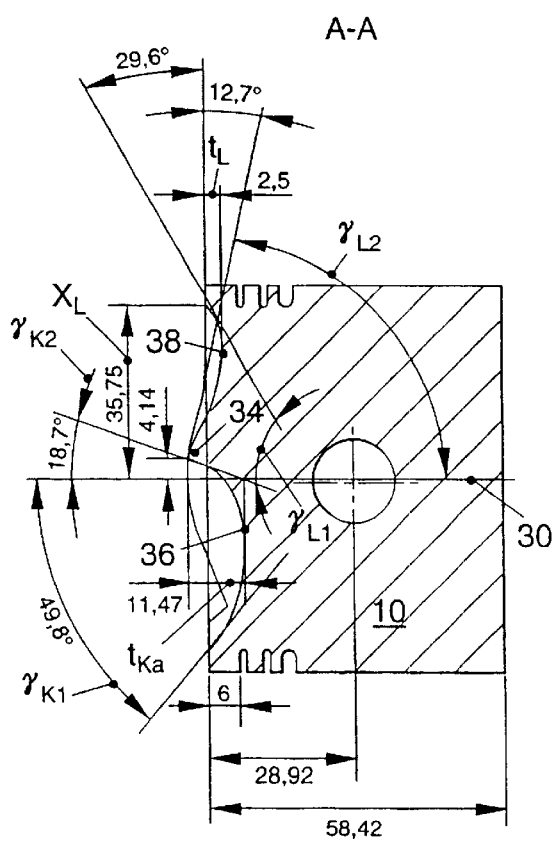
Figure 5B:
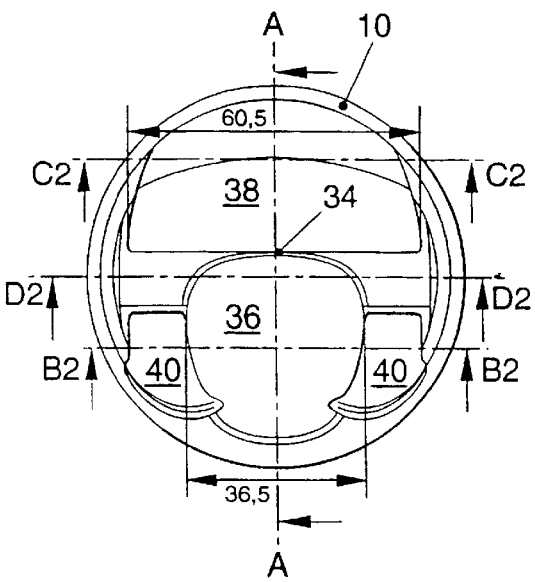
Figure 6A:
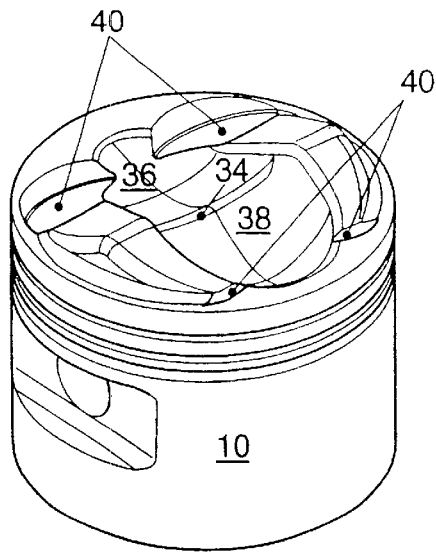
Figure 6D:
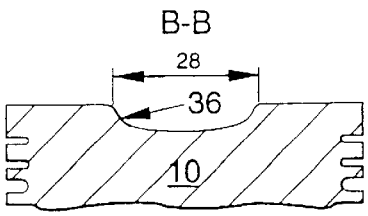
Figure 6E:
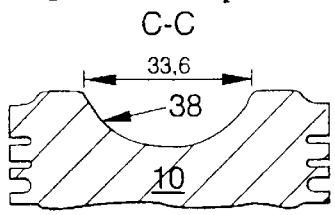
Figure 6F:
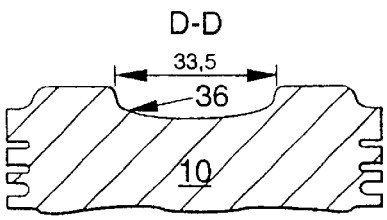
Figure 6C:
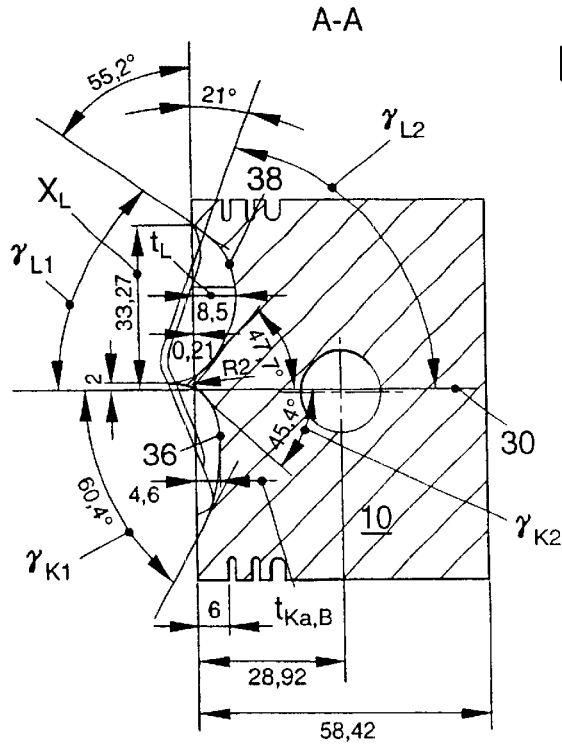
Figure 6B:
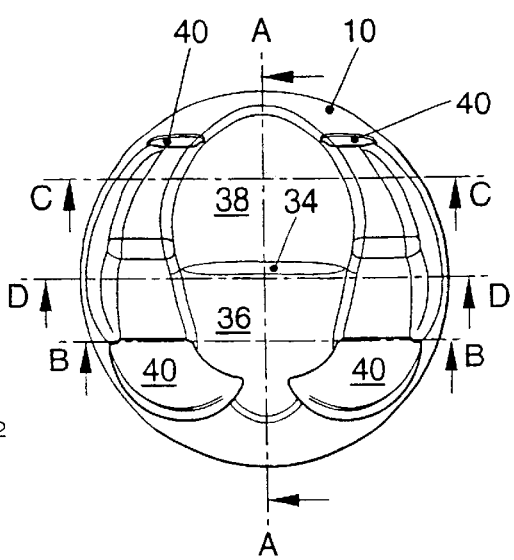

FIG. 2 illustrates predetermined flow conditions in the case of a piston 10 according to the invention with a recess which is divided into a fuel recess 36 and an air recess 38 by an elevation 34. The injection jet 24 and air 26 enter the double recess 36, 38 from opposite directions, are deflected by the elevation 34, are mixed together above the elevation 34 and correspondingly form an ignitable mixture at the ignition point 20. In this case, the geometry of the recesses 36, 38 and of the elevation 34 decisively influence mixture formation and also the accurate coordination of the elevation flank angles $\alpha$ and $\beta$ (FIG. 2) and the position of the fuel injection angle.

In the embodiments according to FIGS. 3 to 6, as explained above, an elevation 34 subdividing the recess 32 into a fuel recess 36 and an air recess 38 is provided on the piston head 12, the elevation 34 projecting above the piston head 12 in a preferred embodiment. In a sectional plane according to FIG. 1 or the respective FIGS. 3C to 6C, the fuel recess 36 has a greatest depth $t_{Ka}$ (FIG. 3C) between the elevation 34 and a lower fuel-recess edge of approximately 4 to 13 mm, in particular 11.1 mm (FIG. 3C), 11.41 mm (FIG. 4C), 11.47 mm (FIG. 5C) and 4.6 mm (FIG. 6C). Between a highest point and a lower air-recess edge, a dimension $t_{Kb}$ has values of between 4 and 8 mm, in particular 6 mm, 7.61 mm and 4.6 mm. Furthermore, the air recess 38 has a depth $t_L$ (FIG. 3C) with respect to an air-recess edge located opposite the elevation 34 of 2 mm to 10 mm, in particular 8 mm, 3.07 mm, 2.5 mm or 8.5 mm. The air-recess edge located opposite the elevation 34 is at a perpendicular distance $x_L$ (FIG. 3C) from the longitudinal center axis 30 of 33 mm to 36 mm, in particular 35.76 mm, 33.2 mm, 34.6 mm, 35.75 mm or 33.27 mm. The elevation 34 is at a perpendicular distance $x_E$ (FIG. 3C) from the longitudinal center axis 30 of 0 mm to 7 mm, in particular 0.5 mm, 6.85 mm, 4.14 mm or 2 mm. A tangent of a fuel-recess wall at a fuel-recess edge located opposite the elevation 34 forms with the longitudinal center axis 30 an angle $\gamma_{K1}$ (FIG. 3C) of 40 degrees to 62 degrees, in particular 56.4 degrees, 48.9 degrees, 49.8 degrees or 60.4 degrees. A tangent of a fuel-recess wall at the elevation 34 forms with the longitudinal center axis 30 an angle $\gamma_{K2}$ (FIG. 3C) of 8 degrees to 50 degrees, in particular 20.9 degrees, 12.5 degrees, 18.7 degrees or 45.5 degrees. A tangent of an air-recess wall at the elevation 34 forms with a longitudinal center axis 30 an angle $\gamma_{L2}$ (FIG. 3C) of 0 degrees to 80 degrees, in particular 23.2 degrees, 64.6 degrees, 77.3 degrees or 47.7 degrees. A tangent of an air-recess wall at a fuel-recess edge located opposite the elevation 34 forms with the longitudinal center axis 30 an angle $\gamma_{L1}$ (FIG. 3C) of 30 degrees to 62 degrees, in particular 50.6 degrees, 54.2 degrees, 60.4 degrees or 34.8 degrees.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A four-stroke internal-combustion engine with spark ignition, comprising: a combustion space; an injection nozzle operatively arranged so as to directly inject fuel into the combustion space; at least one inlet duct having an inlet valve; at least one outlet duct having an outlet valve, the inlet valve and the outlet valve being arranged on opposite sides of the combustion space, the injection nozzle being arranged on an inlet-valve side of the combustion space; and a piston having a longitudinal center axis extending in a direction of movement of the piston, the piston having a piston head with at least one recess arranged on the inlet-valve side and being designed, with respect to the inlet valve and the injection nozzle, with at least one edge portion of a circumferential contour forming a highest point of the piston head, so that an airflow enters the combustion space from a correspondingly designed inlet duct via the inlet valve and an injection jet enters the combustion space from the injection nozzle into the recess on opposite sides, the piston head further having an elevation that divides the recess into a fuel recess and an air recess transversely to the injection direction so that the injection jet enters the fuel recess on a side located opposite the elevation and the airflow enters the air recess, in a direction opposite to the injection jet, on a side located opposite the elevation, the fuel recess being configured to have a depth $t_{Ka}$, in a sectional plane, between the elevation and a lower fuel-recess edge of 4 mm to 12 mm, the air recess being configured to have a depth $t_L$, in the sectional plane, with respect to an air-recess edge located opposite the elevation of 2 mm to 10 mm, the fuel recess being further configured so that a tangent of a fuel-recess wall at a fuel-recess edge located opposite the elevation forms with the longitudinal center axis an angle $\gamma_{K1}$ of 40 degrees to 62 degrees, the air recess being further configured so that a tangent of an air-recess wall at a fuel-recess edge located opposite the elevation forms with the longitudinal center axis an angle $\gamma_L$ of 30 degrees to 62 degrees.

2. A four-stroke internal combustion engine as defined in claim 1, wherein the elevation projects above the piston head.

3. A four-stroke internal combustion engine as defined in claim 1, wherein the depth $t_{Ka}$ is one of 11.1 mm, 11.41 mm, 11.47 mm and 4.6 mm.

4. A four-stroke internal combustion engine as defined in claim 1, wherein the depth $t_L$ is one of 8 mm, 3.07 mm, 2.5 mm and 8.5 mm.

5. A four-stroke internal combustion engine as defined in claim 1, wherein the angle $\gamma_{L1}$ is one of 50.6 degrees, 54.2 degrees, 60.4 degrees and 34.8 degrees.

6. A four-stroke internal combustion engine as defined in claim 1, wherein the angle $\gamma_{K1}$ is one of 56.4 degrees, 48.9 degrees, 49.8 degrees and 60.4 degrees.

7. A four-stroke internal combustion engine as defined in claim 1, wherein in the sectional plane, the air-recess edge located opposite the elevation is at a perpendicular distance $x_L$ from the longitudinal center axis of 33 mm to 36 mm.

8. A four-stroke internal combustion engine as defined in claim 7, wherein the distance $x_L$ is one of 35.76 mm, 34.6 mm, 35.75 mm and 33.27 mm.

9. A four-stroke internal combustion engine as defined in claim 1, wherein in the sectional plane, the elevation is at a perpendicular distance $X_E$ from the longitudinal center axis of 0 mm to 7 mm.

10. A four-stroke internal combustion engine as defined in claim 9, wherein the distance $x_E$ is one of 0.5 mm, 6.85 mm, 2 mm, and 4.14 mm.

11. A four-stroke internal combustion engine as defined in claim 1, wherein in the sectional plane, a tangent of a fuel-recess wall at the elevation forms with the longitudinal center axis an angle $\gamma_{K2}$ of 10 degrees to 50 degrees.

12. A four-stroke internal combustion engine as defined in claim 11, wherein the angle $\gamma_{K2}$ is one of 20.9 degrees, 12.5 degrees, 18.7 degrees and 45.5 degrees.

13. A four-stroke internal combustion engine as defined in claim 1, wherein, in the sectional plane, a tangent of an air-recess wall at the elevation forms with the longitudinal center axis an angle $\gamma_{L2}$ of 0 degrees to 80 degrees.

14. A four-stroke internal combustion engine as defined in claim 13, wherein the angle $\gamma_{L2}$ is one of 23.2 degrees, 64.6 degrees, 77.3 degrees and 47.7 degrees.

* * * * *